(12) United States Patent
Takemoto

(10) Patent No.: US 7,212,674 B1
(45) Date of Patent: May 1, 2007

(54) METHOD, APPARATUS AND RECORDING MEDIUM FOR FACE EXTRACTION

(75) Inventor: Fumito Takemoto, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 391 days.

(21) Appl. No.: 09/712,191

(22) Filed: Nov. 15, 2000

(30) Foreign Application Priority Data

Nov. 15, 1999 (JP) ............................... 11-323575
Oct. 27, 2000 (JP) ............................... 2000-329061

(51) Int. Cl.
*G06K 9/62* (2006.01)
(52) U.S. Cl. ...................................... 382/209; 382/165
(58) Field of Classification Search ................ 382/165, 382/195, 201, 209, 115, 118, 119, 154
See application file for complete search history.

(56) References Cited

U.S. PATENT DOCUMENTS

| | | | | |
|---|---|---|---|---|
| 5,640,243 A | * | 6/1997 | Koitabashi et al. | 356/401 |
| 5,774,591 A | * | 6/1998 | Black et al. | 382/236 |
| 5,802,220 A | * | 9/1998 | Black et al. | 382/276 |
| 6,035,074 A | * | 3/2000 | Fujimoto et al. | 382/282 |
| 6,044,168 A | * | 3/2000 | Tuceryan et al. | 382/118 |
| 6,075,557 A | * | 6/2000 | Holliman et al. | 348/51 |
| 6,088,040 A | * | 7/2000 | Oda et al. | 345/473 |
| 6,181,806 B1 | * | 1/2001 | Kado et al. | 382/118 |
| 6,466,685 B1 | * | 10/2002 | Fukui et al. | 382/115 |
| 6,608,914 B1 | * | 8/2003 | Yamaguchi et al. | 382/118 |

OTHER PUBLICATIONS

Lee and Ranganath, 3D Deformable face Model for Pose Determination and face synthesis, Image Analysis and Processing, International Conference, Sep. 1999, pp. 260-265.*

Zelinsky et al. ("Human-robot interaction using facial gesture recognition," Zelinsky, A.; Heinzmann, J.; Robot and Human Communication, 1996., 5th IEEE International Workshop on Nov. 11-14, 1996 pp. 256-261).*

* cited by examiner

*Primary Examiner*—Vikkram Bali
*Assistant Examiner*—Anand Bhatnagar
(74) *Attorney, Agent, or Firm*—Birch, Stewart, Kolasch & Birch, LLP

(57) ABSTRACT

A human face is extracted easily from an image including the face. An image including a human face and a face template comprising data of outlines representing a face shape are displayed on a monitor. A user carries out position matching between the face template and a face area which is an image of the face to be extracted from the image, by moving, transforming and/or rotating the face template through an operation of input means, for example. Extraction means calculates a degree of matching between the face area and the template according to the position matching operation. When the degree of matching exceeds a predetermined threshold value, notice of extraction of the face area is displayed on the monitor. The extracted face area is subjected to processing for converting a color tone thereof.

18 Claims, 9 Drawing Sheets

METHOD, APPARATUS AND RECORDING MEDIUM FOR FACE EXTRACTION

BACKGROUND OF THE INVENTION

1. Field of the Invention

The present invention relates to a face extraction method and a face extraction apparatus for extracting a face area from an image including a human face, and to an image processing method and an image processing apparatus using the face extraction method and the face extraction apparatus. The present invention also relates to a computer-readable recording medium storing a program to cause a computer to execute the face extraction method and the image processing method.

2. Description of the Related Art

In an image such as a photograph obtained by photographing a person by using a negative film or a reversal film, an area which attracts most attention is the face of the person. However, in the case where photographing is carried out in backlight or in a state of under-exposure, a face looks too dark. Furthermore, in the case where a close-up of a person is photographed by using flash (in high contrast caused by strobe-flash-light), a tone of the face is flattened and the face looks whitish. Moreover, when a person is photographed in daylight in fine weather, approximately a half of the face appears in shadow, creating too much contrast. Therefore, when an original image recorded on a negative film or the like is printed on a photosensitive material, exposure is adjusted by applying a method such as shading to an area corresponding to the face in the original image so that the face of the person has adequate brightness.

Meanwhile, digital image data obtained by a digital still camera (hereinafter called digital camera) and digital image data obtained by reading an image recorded on a film are reproduced as a hard copy such as a print or as a soft copy on a display screen. In this case, if photographing is carried out in under exposure, in backlight, or in high contrast caused by strobe-flash-light, not only brightness of a face can be changed to adequate brightness but also colors, tones and the like of the face can be reproduced adequately, by applying correction for brightness, tones, colors, and sharpness on image data of a face area.

When such correction is carried out on the image data, it is necessary for the face area corresponding to the face of the person to be extracted from the image represented by the image data. For example, a method comprising the steps of specifying an area including a human face in an image displayed on a monitor, specifying a pixel of a skin-color area in the face in the specified area, and extracting pixels having colors in a predetermined range as a face area by using the specified pixel color as a reference has been proposed (hereinafter, this method is called "method 1"). Alternatively, another method comprising the steps of specifying a face outline in an image displayed on a monitor by using a mouse and extracting an area enclosed by the specified outline as a face area has also been proposed (hereinafter, this method is called "method 2").

However, in the method 1, the face area cannot be extracted if the contrast of the face is sharp, since only the pixels of the colors in the predetermined range using the specified skin color as the reference are extracted. In the case where the background of the face has the color in the predetermined range, the background is also extracted together with the face area. In the method 2, since the outline needs to be specified accurately by using a mouse, an operation for specifying the area is troublesome.

SUMMARY OF THE INVENTION

The present invention has been conceived based on consideration of the above problems. An object of the present invention is therefore to provide a face extraction method and a face extraction apparatus enabling easy extraction of a human face from an image, an image processing method and an image processing apparatus using the face extraction method and the face extraction apparatus, and a computer-readable recording medium storing a program to cause a computer to execute the face extraction method and the image processing method.

A face extraction method of the present invention is a method of extracting a face area from an image including a human face, and the method comprises the steps of:

displaying the image and a predetermined face template;

carrying out position matching between the face template and the face area to be extracted, by moving, transforming, and/or rotating the face template and/or the image according to an input from input means; and extracting the face area based on a result of the position matching.

The "face template" herein referred to expresses at least a general shape of human face and positions of eyes by outlines thereof. However, the template may include parts comprising a human face, such as positions of a mouth and ears, in addition to the face shape and the positions of eyes. The face template may have a two-dimensional shape. However, it is preferable for the face template to have a three-dimensional shape. Especially, in the case of a three-dimensional shape, it is preferable for the shape to be formed by a three-dimensional wire frame. Furthermore, it is preferable for the face template to have a color different from a skin color which is a color of a face. Especially, it is preferable for the face template to have a CB (Cyan Blue) color which is complementary to the skin color.

The phrase stating "according to an input from input means" refers to "according to an input from a mouse or a keyboard by a user".

"Carrying out position matching by moving, transforming, and/or rotting the face template and/or the image" refers to a manual position matching operation by the user between the face area to be extracted and the face template through an operation such as changing a position or a size of the face template and/or the image, or rotating the face template and/or the image by using the mouse or the keyboard. In the case where the face template has a three-dimensional shape, a direction of the face template can also be changed. In the case where the image is moved, transformed, and/or rotated, not only the image as a whole but also a portion of the image corresponding to the face area therein or an area of a predetermined range including the face area may be moved, transformed, and/or rotated.

In the face extraction method of the present invention, it is preferable for the step of extracting the face area to comprise the steps of calculating a degree of matching between the face template and the face area based on the result of position matching and extracting the face area based on the degree of matching.

Furthermore, "extracting the face area based on the degree of matching" refers to extraction of an area corresponding to the face template as the face area in the image, in the case where the degree of matching reaches a predetermined value or more, for example.

In this case, it is preferable for unsharp images of the face template and the area corresponding to the face template in the image to be generated so that the degree of matching can be calculated between the unsharp images.

A face extraction apparatus of the present invention is an apparatus for extracting a face area from an image including a human face, and the apparatus comprises:

display means for displaying the image and a predetermined face template;

input means for receiving an input for moving, transforming, and/or rotating the face template and/or the image;

position matching means for carrying out position matching between the face template and the face area to be extracted, by moving, transforming, and/or rotating the face template and/or the image according to the input from the input means; and extraction means for extracting the face area based on a result of the position matching by the position matching means.

In the face extraction apparatus of the present invention, it is preferable for the extraction means to extract the face area by calculating a degree of matching between the face template and the face area based on the result of position matching by the position matching means.

In this case, it is preferable for the extraction means to calculate the degree of matching by generating unsharp images of the face template and an area corresponding to the face template in the image.

Furthermore, it is also preferable for the face template to have a three-dimensional shape. In this case, it is preferable for the three-dimensional shape to be formed by a three-dimensional wire frame.

In the face extraction apparatus of the present invention, it is also preferable for the template to have a color different from a skin color, especially a color complementary to the skin color.

An image processing method of the present invention is a method of carrying out image processing on the face area extracted according to the face extraction method of the present invention, and the image processing method comprises the step of:

converting a color tone of a desired area including the face area to a color tone of a predetermined target image.

The "desired area including the face area" includes not only the entire face area but also a specific area in the face area, the entire image including the face area, and an area including both the face area and an area other than the face area.

An image processing apparatus of the present invention is an apparatus for carrying out image processing on the face area extracted by the face extraction apparatus of the present invention, and the image processing apparatus comprises:

conversion means for carrying out conversion of a color tone of a desired area including the face area to a color tone of a predetermined target image.

The face extraction method and the image processing method of the present invention may be provided in the form of a computer-readable recording medium storing a program to cause a computer to execute the methods.

According to the present invention, based on the input from the input means, position matching is carried out between the face template and the face area to be extracted by moving, transforming, and/or rotating the face template and/or the image, and the face area is extracted based on the result of position matching. Therefore, even in the case where contrast of the face area is sharp, the entire face area can be extracted if the face template and the face area to be extracted are in agreement. Furthermore, even in the case where a background of the face area has a color close to a skin color, the face area can be extracted from the image. Moreover, since position matching is carried out between the face template and the face area by moving, transforming, and/or rotating the face template and/or the image, accurate specification of face outline in the method 2 described above is unnecessary. Therefore, an operation for specifying the face area becomes less complicated. In this manner, the face area can be extracted easily and accurately from the image.

By extracting the face area based on the degree of matching between the face template and the face area calculated based on the position matching result, the face area cannot be extracted unless the position matching between the face template and the face area is carried out to some degree of accuracy. Therefore, the face area can be extracted more accurately.

Furthermore, the position matching can be carried out comparatively easily by generating the unsharp images of the face template and the area corresponding to the face template, although accurate position matching of the face in the image and the face template is time-consuming. Therefore, extraction of the face area can be carried out more easily.

Moreover, by using the face template having a three-dimensional shape, extraction of the face area included in the image becomes possible regardless of a direction of the face in the image.

By using the color different from the skin color as the template color, the face template becomes conspicuous in the image, which leads to an easy position matching operation. Especially, if the color of the template is the color complementary to the skin color, the face template becomes more conspicuous in the image, which leads to an easier position matching operation.

According to the image processing method and the image processing apparatus of the present invention, the desired area including a specified area can be changed so as to have the color tone desired by the user, since the color tone of the desired area including the face area having been extracted by the face extraction method and the face extraction apparatus is converted into the color tone of the predetermined target image.

DESCRIPTION OF THE PREFERRED EMBODIMENT

Hereinafter, an embodiment of the present invention will be explained with reference to the accompanying drawings.

Figure 1:
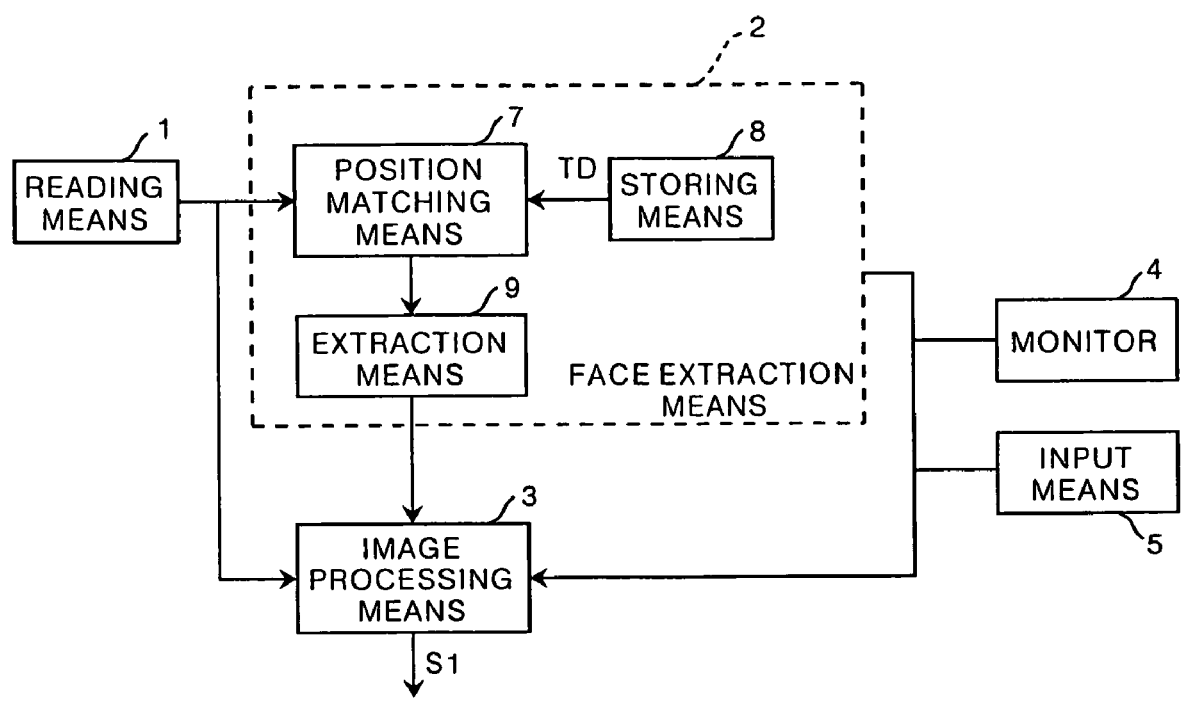
FIG. 1 is a block diagram showing a configuration of an image processing apparatus according to an embodiment of the present invention.

FIG. 1 is a block diagram showing an outline configuration of an image processing apparatus adopting a face extraction apparatus according to an embodiment of the present invention. As shown in FIG. 1, the image processing apparatus in this embodiment obtains processed image data S1 by carrying out processing on image data S representing an image including a human face photographed by a digital camera or read by a scanner. The image processing apparatus comprises reading means 1 for reading the image data S from a recording medium having the image data S therein or for reading the image data S transferred via a network, face extraction means 2 for extracting the human face from the image represented by the image data S, image processing means 3 for carrying out the image processing on the image data S, a monitor 4 for displaying the image data S and the like, and input means 5 comprising a mouse and a keyboard for carrying out various kinds of inputs to the face extraction means 2 and to the image processing means 3. In this embodiment, the image processing means 3 converts a color tone of the face extracted by the face extraction means 2.

The face extraction means 2 comprises position matching means 7 for displaying a template T of a face image (hereinafter called face template) represented by template data TD stored in storing means 8 in a state where the image represented by the image data S is shown on the monitor 4 and for carrying out position matching between the face template T and a face area to be extracted (hereinafter simply called face area) from the image displayed on the monitor 4 based on an instruction from the input means 5, and extraction means 9 for extracting the face area based on a degree of matching between the face area and the face template T.

Figure 2:
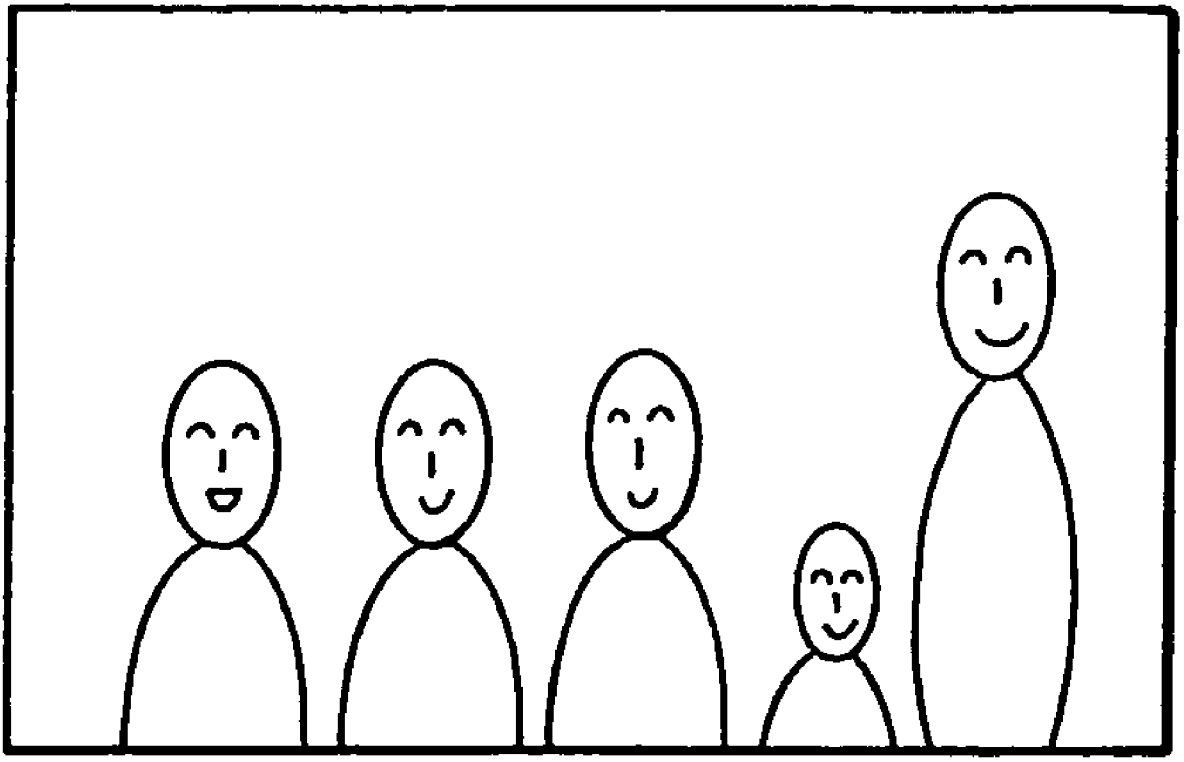
FIG. 2 is an illustration showing an image displayed on a monitor.

FIG. 2 shows the image represented by the image data S displayed on the monitor 4. As shown in FIG. 2, the image including human faces of a plurality of persons is displayed on the monitor 4.

Figure 3:
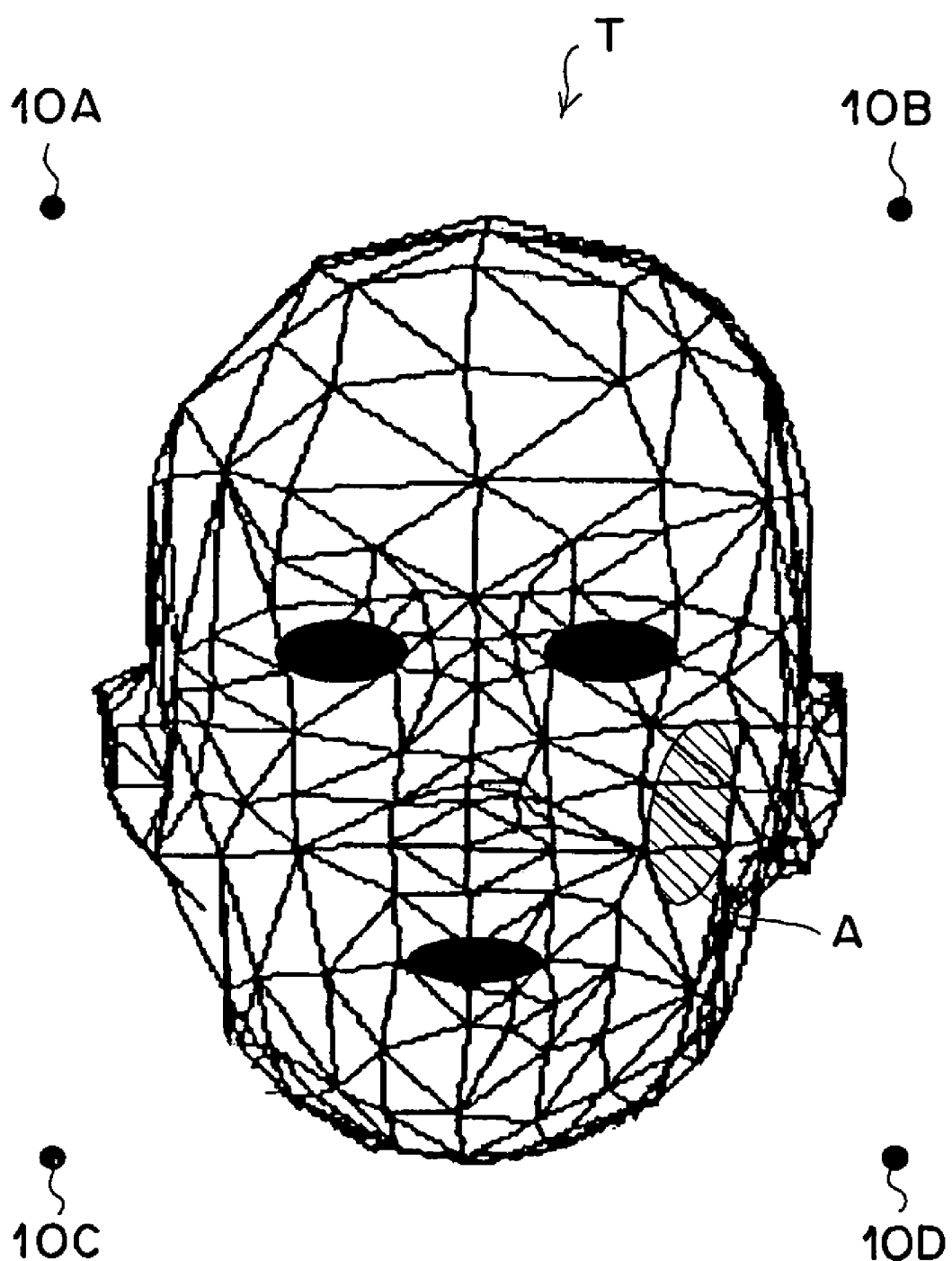
FIG. 3 is an illustration showing a face template.

FIG. 3 shows the face template T. As shown in FIG. 3, the face template T is formed by representing outlines of a shape of a human face and eyes and a mouth by using three-dimensional wire frames. Four points 10A~10D are displayed around the face template T. The color of the face template T, that is, the color of the wire frames is CB (Cyan Blue) which is complementary to a skin color. By displaying this face template on the monitor 4 and by dragging one of the four points 10A~10D by left clicking of the mouse, the face template T can be enlarged, reduced, and transformed vertically and horizontally. For example, by dragging the point 10A in a vertical direction, the face template T can be transformed in the vertical direction, relative to the points 10C and 10D. By dragging the point 10A in a horizontal direction, the face template T can be transformed in the horizontal direction, relative to the points 10B and 10C. Furthermore, by dragging the point 10A obliquely at a 45-degree angle, the face template T can be enlarged or reduced relative to the point 10C.

Moreover, by clicking a right button of the mouse and dragging one of the points 10A~10D, the face template T can be rotated. For example, by dragging the point 10A in a circle, the face template T can be rotated with the point 10D as the center of rotation.

The face template T can be moved by left clicking on the mouse and dragging an area enclosed by the points 10A~10D.

Figure 4:
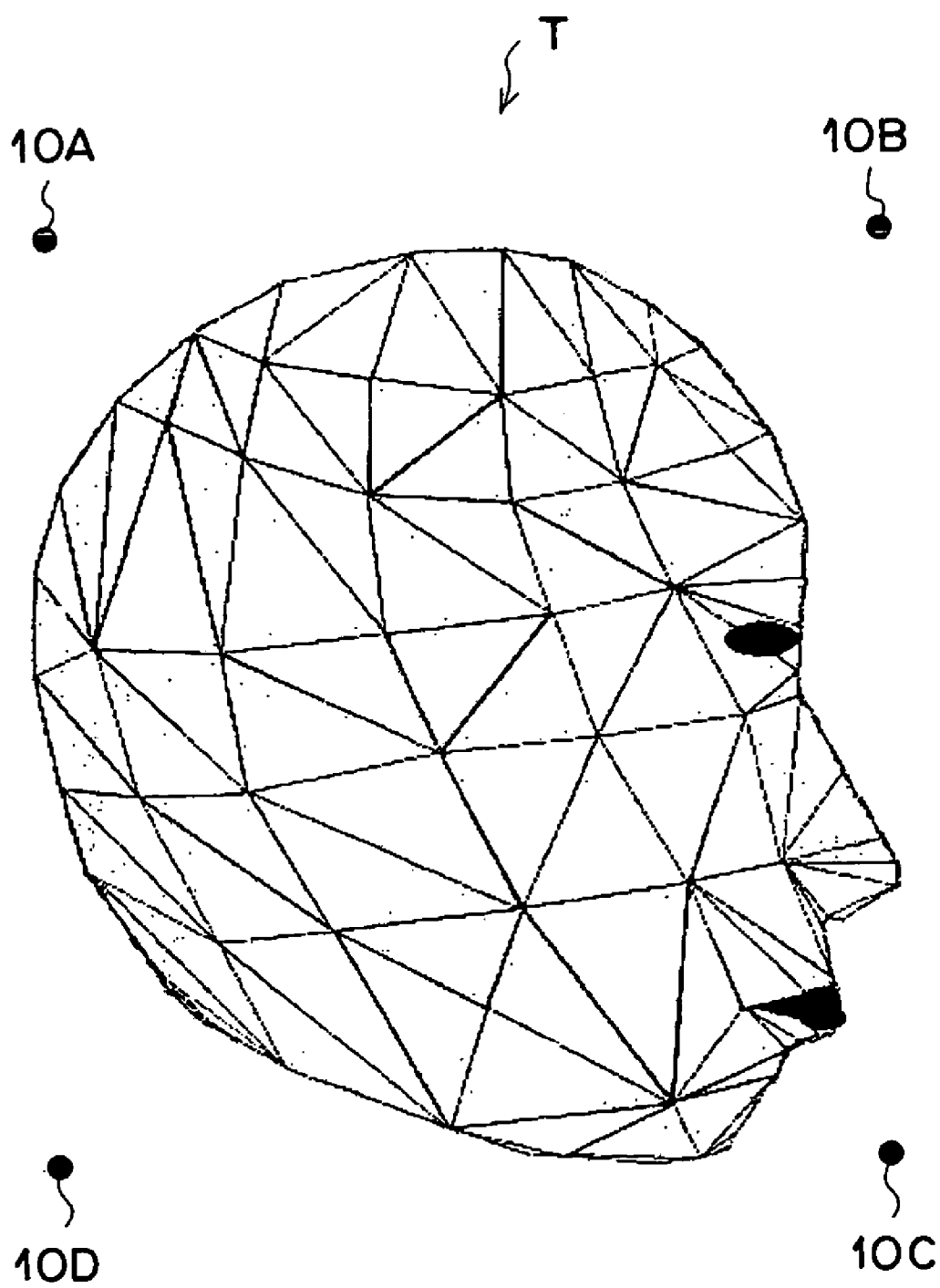
FIG. 4 is an illustration showing a state in which a direction of the face template has been changed.

By left clicking on any one of top, bottom, right, and left areas within the face template T, a direction of the template T can be changed according to how many times the mouse is clicked. For example, by left clicking on a hatched area A shown in FIG. 3, the direction of the face template T can be moved to the right. According to the number of clicks, the direction of the face template T can be changed so that the face represented by the face template T looks towards the left as shown in FIG. 4.

A user selects the face to be extracted from the image displayed on the monitor 4 and displays the face template T on the monitor 4. The user then moves the face template T to the face position by using the input means 5 and positions the face template T onto the face area while transforming (including direction change), enlarging, reducing, and/or rotating the face template T as has been described above.

The extraction means 9 obtains outline data F by extracting an outline through a filtering processing using a Laplacian filter or the like on the image data S in the area corresponding to the face template T. The extraction means then generates unsharp image data Fus of the outline data F and unsharp image Tus of the template data TD. The extraction means calculates a degree of matching M between the unsharp image data Fus and the unsharp data Tus according to the following Equation (1) each time the user caries out the position matching operation by using the position matching means 7, that is, each time the face template T is moved, transformed and/or rotated by the user.

$$M = (\Sigma |Tus_{ij} - Fus_{ij}|)/n \quad (1)$$

where $Tus_{ij}$ is a pixel value of the image represented by the unsharp data Tus, $Fus_{ij}$ is a pixel value of the image represented by the unsharp image data Fus corresponding to the unsharp data $Tus_{ij}$, and n is the number of pixels in the image represented by the unsharp data $Tus_{ij}$ or the unsharp image data $Fus_{ij}$. The degree of matching M calculated in the above manner is then compared with a predetermined threshold value $\alpha$. When the degree of matching M exceeds the threshold value $\alpha$, notice of extraction of the face area is displayed on the monitor 4.

If the degree of matching is calculated by using an accurate outline, the degree of matching M tends not to exceed the threshold value $\alpha$ unless the face template T and the face area agree with accuracy. Therefore, this position matching operation becomes complicated. Meanwhile, if the unsharp image data Fus of the outline data F and the unsharp data Tus of the template T are found to calculate the degree of matching M between these data sets, the degree of matching tends to exceed the threshold value $\alpha$ more easily without accurate agreement between the face template T and the face area, which leads to easier position matching between the template T and the face area.

Figure 5:
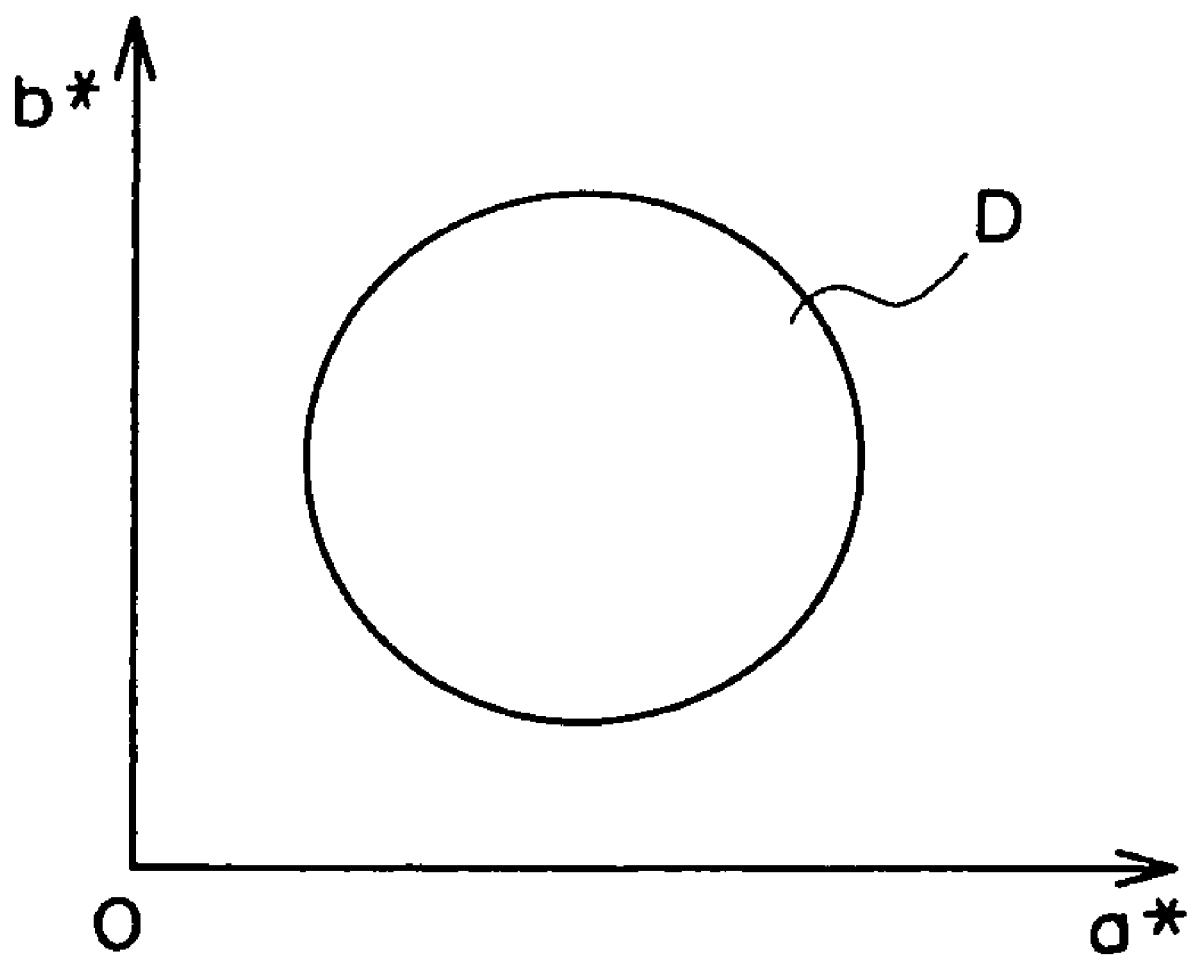
FIG. 5 is a diagram showing a skin-color zone in an L*a*b* space.

Once the face area has been extracted in the above manner, the image processing means 3 carries out image processing on the image data S in the following manner. First, within the face area having been extracted, an area of skin color having a predetermined range including a whitish skin color caused by high contrast due to strobe-flash-light and a dark skin color caused by backlight is extracted. As shown in FIG. 5, this extraction is carried out by using a skin-color zone D including an area enclosed by a circle in an L*a*b* space shown in FIG. 5, by converting the pixel values in the face area into the L*a*b* space and by extracting pixels having pixel values included in the skin-color zone D as the skin-color area in the face area.

Figure 6:
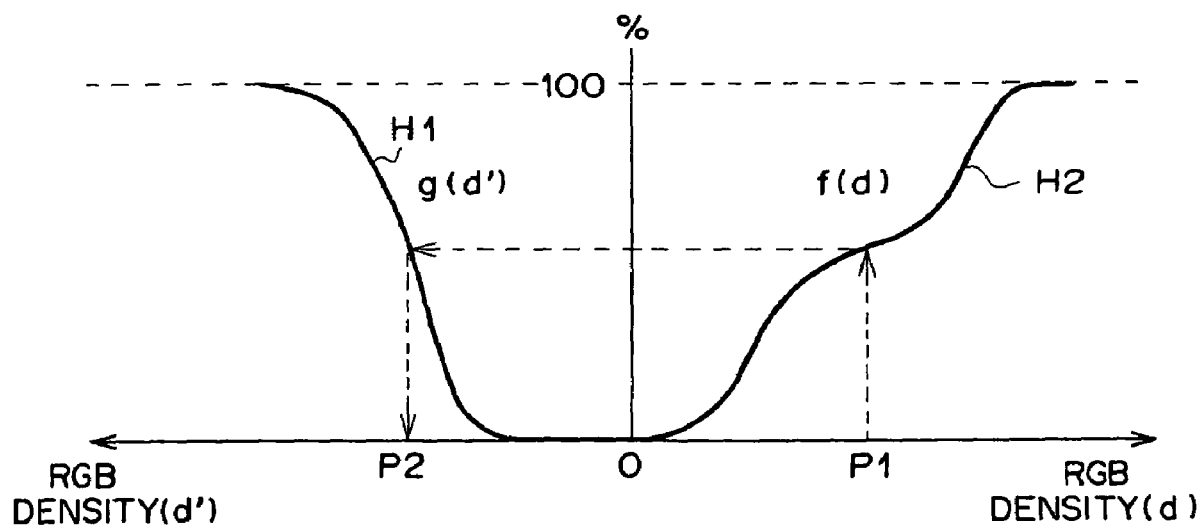
FIG. 6 is a diagram showing cumulative histograms.

After the skin-color area in the face area has been extracted in the above manner, cumulative histograms of an image having a predetermined target color tone (hereinafter called a target image) and the skin-color area are generated. FIG. 6 shows cumulative histograms H1 and H2 of the target image and the skin-color area, respectively. In FIG. 6, an RGB density increases toward the left of a horizontal axis for the histogram H1 and toward the right for the histogram H2. The histograms H1 and H2 are generated for each set of R, G, and B color data if the image data S comprise the RGB color data sets. For the sake of simplicity, the color data sets are assumed to be one set of RGB data, and the histograms H1 and H2 are generated from this set of RGB data. The cumulative histograms H1 and H2 represent characteristic values of the target image and the face area respectively.

The color tone of the target image may be set in advance, as has been described above. Alternatively, a plurality of face images each having a different color tone may be displayed on the monitor 4 so that the user can select one of the face images having a desired color tone. The color tone of the selected face image is used as the color tone of the target image.

After the cumulative histograms H1 and H2 have been generated in the above manner, color conversion processing is carried out so as to convert the color tone of the skin-color area into the color tone of the target image, based on the cumulative histograms H1 and H2. The histogram H1 is related to the histogram H2 as shown by a dashed line in FIG. 6, and the color tone of the skin-color area is converted in such a manner that a pixel having an RGB density P1 in the histogram H2 comes to have an RGB density P2. The processing shown by the dashed line in FIG. 6 is expressed by the following Equation (2) when the cumulative histograms H1 and H2 are represented by functions g(d') and f(d) respectively:

$$d'=g^{-1}(f(d)) \quad (2)$$

When the color tone of only the skin-color area is converted, a boundary area thereof looks unnatural. Therefore, it is preferable for the color tone of the boundary area to be converted gradually.

Figure 7:
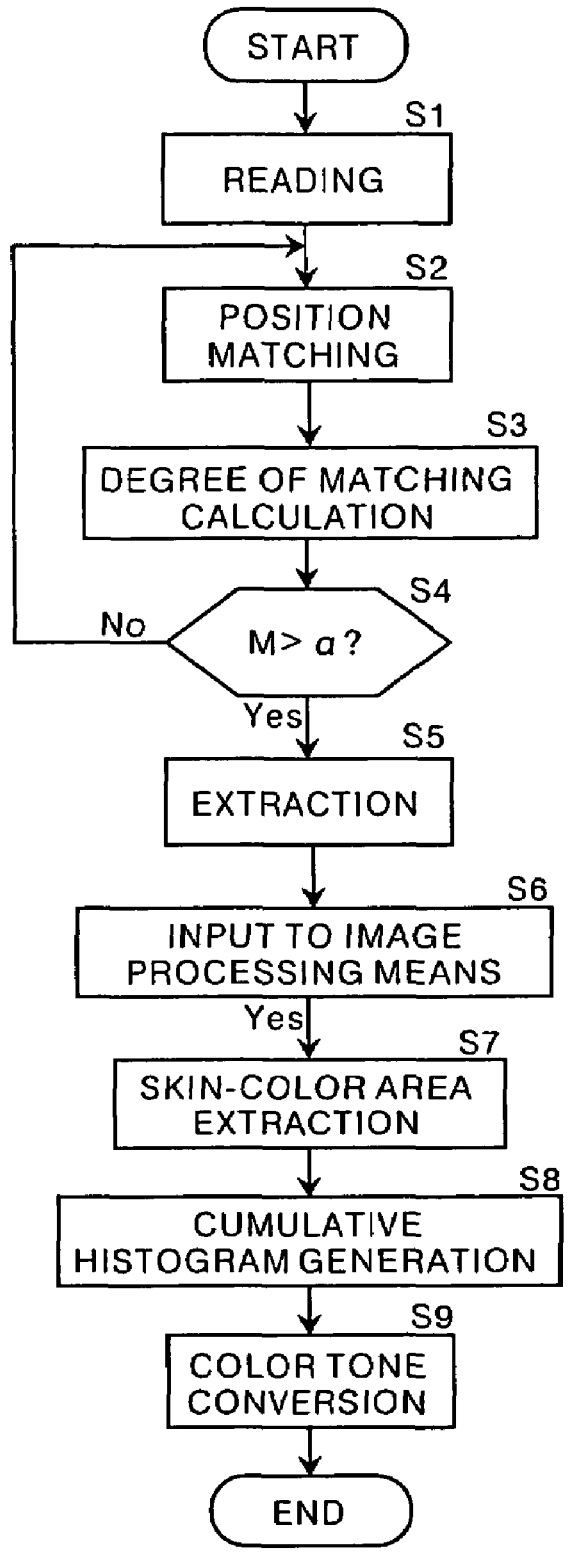
FIG. 7 is a flow chart showing an operation of the embodiment.

An operation of this embodiment will be explained next. FIG. 7 is a flow chart showing the operation of this embodiment. The image data S are read and input to the face extraction means 2 (Step S1). In the face extraction means 2, the face template T and the image represented by the image data S are displayed on the monitor 4, and the user operates the input means 5 so that the position matching means 7 carries out position matching between the face area in the image and the face template T (Step S2). Every time the operation such as moving, transforming, and/or rotating the template T is carried out by the user, the degree of matching M is calculated (Step S3), and judgment as to whether or not the degree of matching exceeds the threshold value α is made (Step S4). When a result at Step S4 is negative, the procedure goes back to Step S2 and the procedure from Step S2 to Step S4 is repeated. When the result at Step S4 is affirmative, the image at the position corresponding to the template T is extracted as the face area (Step S5).

After the face area has been extracted in the above manner, notice of the extraction is input to the image processing means 3 (Step S6). In the image processing means 3, the skin-color area included in the face area is extracted (Step S7). After the skin-color area has been extracted, the cumulative histograms H1 and H2 of the predetermined target image and the skin-color area are generated (Step S8). Based on the histograms H1 and H2, the processed image data S1 are obtained by converting the color tone of the skin-color area into the color tone of the target image as shown by Equation (2) (Step S9), and the processing is completed.

As has been described above, in this embodiment, position matching is carried out between the face template T and the face area by moving, transforming, and/or rotating the face template T, and the face area is extracted based on the position matching result. Therefore, even in the case where contrast of the face area is sharp, the entire face area can be extracted if the face template T and the face area to be extracted are in agreement. Even in the case where a background of the face has a color close to a skin color, the face area can be extracted from the image. Furthermore, since the position matching is carried out between the face template and the face area by moving, transforming, and/or rotating the face template T, accurate specification of a face outline in the method 2 described above is unnecessary. Therefore, an operation for specifying the face area becomes less complicated. Consequently, the face area can be extracted from the image easily and accurately.

Furthermore, since the target image having the desired color tone is set in advance and the color tone of the face area is converted so as to become the same as the color tone of the target image, the skin-color area in the face area having been extracted can be changed so that the image has the color tone desired by the user.

Moreover, since the color of the face template T is complementary to the skin color, the face template becomes more conspicuous in the image, which leads to an easy operation of the position matching.

In the above embodiment, the face template is formed by the three-dimensional wire frames. However, any template having a three-dimensional shape may be used. The template may have a two-dimensional shape. If the template has a two-dimensional shape, the direction of the template cannot be changed.

In the above embodiment, the template T comprises the outlines of the face, the eyes and the mouth. However, the template may comprise outlines of only the face shape and the eyes. Alternatively, the template T may further include outlines of the nose and ears in addition to the outlines of the face shape, the eyes and the mouth.

In the above embodiment, the color of the face template T is the CB color which is complementary to the skin color. However, the color is not limited to this example, and any color different from the skin color can be used.

In this embodiment, the color tone of only the skin-color area in the face area is changed. However, the color tone of the entire face area may be changed. Alternatively, the color tone of an area of a predetermined range including the face area, or the color tone of the entire image displayed on the monitor 4 may be changed.

In the above embodiment, the histogram H1 of the target image is generated. However, the cumulative histogram of the target image may be generated in advance.

Figure 8:
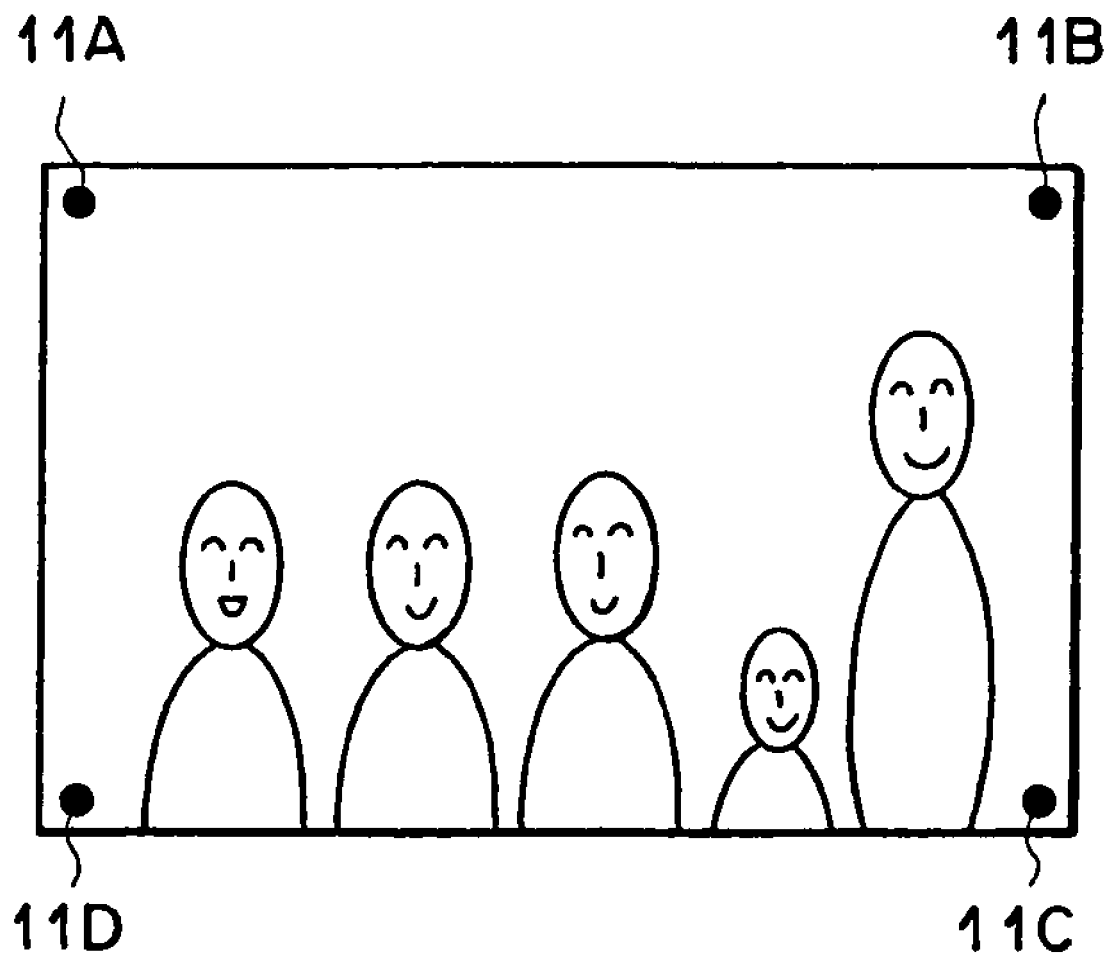
FIG. 8 shows how the image is moved.

In the above embodiment, position matching is carried out between the face template T and the face area to be extracted, by moving, transforming, and/or rotating the template T. However, the image represented by the image data S may be moved, transformed, and/or rotated for the position matching between the face template T and the face area. In this case, as shown in FIG. 8, points 11A~11D corresponding to the points 10A~10D in FIG. 3 are displayed at four corners of the image represented by the image data S, and the image can be moved, transformed, and/or rotated by dragging these points with the mouse, for the position matching between the face template T and the face area in the image. In this case, not only the image represented by the image data S but also the face template T may be moved, transformed, and/or rotated.

Figure 9:
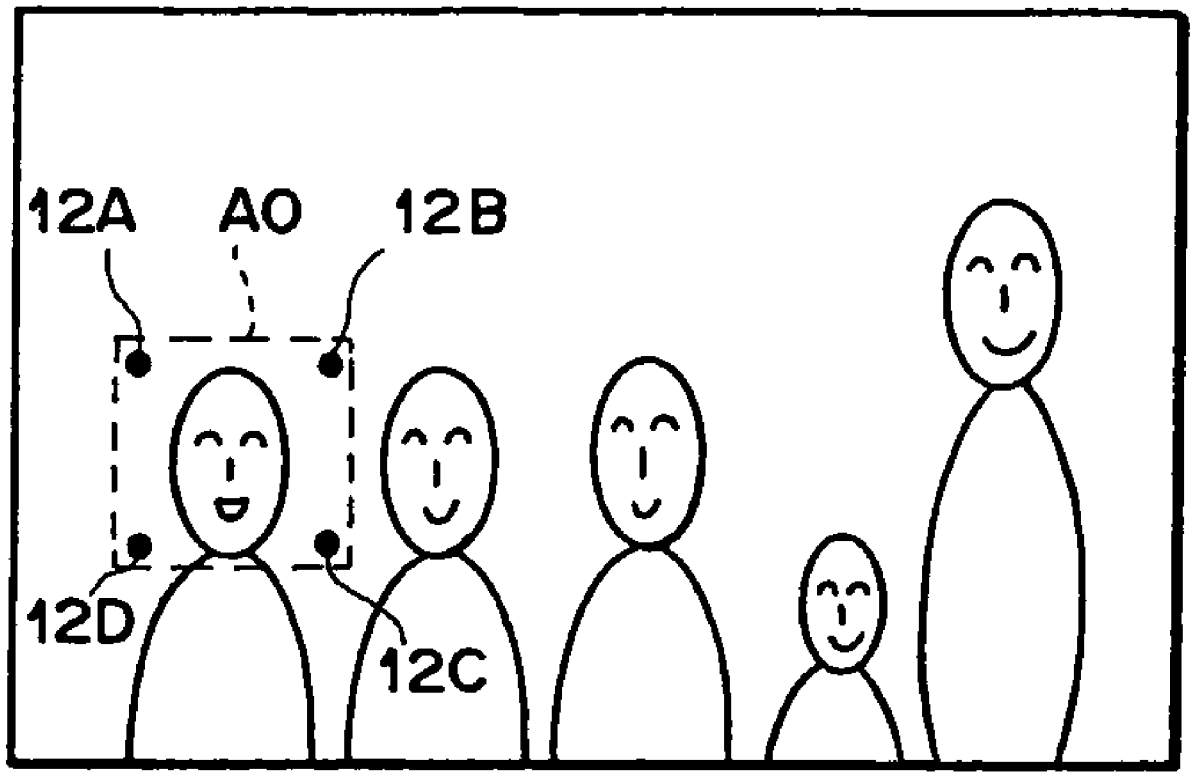
FIG. 9 shows how a face area in the image is moved.

Furthermore, instead of the entire image represented by the image data S, the face to be extracted may be selected and an area in a predetermined range including the selected face may be moved, transformed, and/or rotated. For example, if the face of a person in the left of FIG. 9 is selected as the face to be extracted, a rectangular area A0 including the face is set, and points 12A~12D corresponding to the points 10A~10D in FIG. 3 are displayed at four corners of the rectangular area A0. By dragging these points 12A~12D with the mouse, the rectangular area is moved, transformed, and/or rotated for the position matching between the face template T and the face area in the image. In this case, not only the rectangular area A0 but also the face template T may be moved, transformed, and/or rotated.

Unlike the face template T, a direction of the image represented by the image data S or the rectangular area A0 set in the image cannot be changed.

In addition, all of the contents of Japanese Patent Application Nos. 11(1999)-323575 and 2000-329061 are incorporated into this specification by reference.

What is claimed is:

1. A method of extracting a face area from an image including a human face, the face extraction method comprising the steps of:
    displaying the image and a predetermined face template;
    carrying out position matching between the face template and the face area to be extracted, by moving the face template and/or the image so that the face template is positioned on the face area to be extracted,
    transforming and/or rotating the face template and/or the image on the face area position according to an input from input means by a user;
    extracting the face area based on a result of position matching by generating unsharp images of the face template and an area corresponding to the face template in the image, calculating a degree of matching between the unsharp images in accordance with the position matching and extracting the face area based on the degree of matching.

2. A face extraction method as defined in claim 1, wherein the face template has a three-dimensional shape.

3. A face extraction method as defined in claim 2, wherein the three-dimensional shape is formed by a three-dimensional wire frame.

4. A face extraction method as defined in claim 1, wherein the face template has a color different from a skin color.

5. A face extraction method as defined in claim 4, wherein the color different from the skin color is a complementary color of the skin color.

6. A method of carrying out image processing on the face area extracted by using the face extraction method according to claim 1, the image processing method comprising the step of:
    converting a color tone of a desired area including the face area to a color tone of a predetermined target image.

7. A face extraction apparatus for extracting a face area from an image including a human face, the apparatus comprising:
    display means for displaying the image and a predetermined face template;
    input means for receiving an input for moving and transforming the face template;
    position matching means for carrying out position matching between the face template and the face area to be extracted, by moving the face template and/or the image so that the face template is positioned on the face area to be extracted, transforming and/or rotating the face template and/or the image on the face area position according to the input from the input means by a user; and
    extraction means for extracting the face area based on a result of position matching by the position matching means,
    wherein the extraction means extracts the face area by calculating a degree of matching according to the position matching by the position matching means by generating unsharp images of the face template and an area corresponding to the face template in the image and calculating the degree of matching between the unsharp images.

8. A face extraction apparatus as defined in claim 7, wherein the face template has a three-dimensional shape.

9. A face extraction apparatus as defined in claim 8, wherein the three-dimensional shape is formed by a three-dimensional wire frame.

10. A face extraction apparatus as defined in claim 7, wherein the face template has a color different from a skin color.

11. A face extraction apparatus as defined in claim 10, wherein the color different from the skin color is a complementary color to the skin color.

12. An image processing apparatus for carrying out image processing on the face area extracted by the face extraction apparatus according to claim 7, the image processing apparatus comprising:
    conversion means for converting a color tone of a desired area including the face area to a color tone of a predetermined target image.

13. A computer-readable recording medium storing a program to cause a computer to execute a method of extracting a face area from an image including a human face, the program comprising the procedures of:
    displaying the image and a predetermined face template;
    carrying out position matching between the face template and the face area to be extracted, by moving the face template and/or the image so that the face template is positioned on the face area to be extracted, transforming and/or rotating the face template and/or the image on the face area position according to an input from input means by a user; and
    extracting the face area based on a result of the position matching,
    wherein the procedure of extracting the face area comprises the procedures of calculating a degree of matching between the face template and the face area in accordance with the position matching by generating unsharp images of the face template and an area corresponding to the face template in the image and calculating the degree of matching between the unsharp images and extracting the face area based on the degree of matching.

14. A computer-readable recording medium as defined in claim 13, wherein the face template has a three-dimensional shape.

15. A computer-readable recording medium as defined in claim 14, wherein the three-dimensional shape is formed by a three-dimensional wire frame.

16. A computer-readable recording medium as defined in claim 13, wherein the face template has a color different from a skin color.

17. A computer-readable recording medium as defined in claim 16, wherein the color different from the skin color is a complementary color to the skin color.

18. A computer-readable recording medium storing a program to cause a computer to execute a method of carrying out image processing on a face area extracted by the steps of:

displaying the image and a predetermined face template;

carrying out position matching between the face template and the face area to be extracted, by moving the face template and/or the image so that the face template is positioned on the face area to be extracted, transforming and/or rotating the face template and/or the image on the face area position according to an input from input means by a user; and extracting the face area based on a result of position matching by generating unsharp images of the face template and an area corresponding to the face template in the image, calculating a degree of matching between the unsharp images in accordance with the position matching and extracting the face area based on the degree of matching; and converting a color tone of a desired area including the face area to a color tone of a predetermined target image.

* * * * *